(12) United States Patent
Talbert et al.

(10) Patent No.: US 9,122,461 B2
(45) Date of Patent: Sep. 1, 2015

(54) METHOD AND SYSTEM FOR ITERATIVELY PARTITIONING AND VALIDATING PROGRAM TREES INTO ENVIRONMENTS AT VISIBILITY SPACE GRANULARITY

(75) Inventors: Nathan C. Talbert, Seattle, WA (US); Kenneth D. Wolf, Seattle, WA (US); Edmund Samuel Victor Pinto, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 797 days.

(21) Appl. No.: 12/635,984

(22) Filed: Dec. 11, 2009

(65) Prior Publication Data

US 2011/0145826 A1    Jun. 16, 2011

(51) Int. Cl.
*G06F 9/46* (2006.01)
*G06F 9/44* (2006.01)
*G06F 9/45* (2006.01)

(52) U.S. Cl.
CPC ...... *G06F 8/20* (2013.01); *G06F 8/434* (2013.01); *G06F 2009/4441* (2013.01)

(58) Field of Classification Search
CPC .... G06F 8/20; G06F 8/434; G06F 2009/4441
USPC .......... 718/100, 102; 705/7.26, 7.27; 717/106
See application file for complete search history.

(56) References Cited

U.S. PATENT DOCUMENTS

| | | | |
|---|---|---|---|
| 5,799,311 A | 8/1998 | Agrawal | |
| 5,896,537 A | 4/1999 | Landi | |
| 6,950,850 B1* | 9/2005 | Leff et al. | 709/203 |
| 6,959,432 B2* | 10/2005 | Crocker | 717/126 |
| 6,985,144 B2 | 1/2006 | Chang | |
| 7,102,641 B2 | 9/2006 | Hudson, Jr. | |
| 7,240,324 B2* | 7/2007 | Casati et al. | 717/103 |
| 7,584,444 B2 | 9/2009 | Zhou | |
| 7,805,327 B1* | 9/2010 | Schulz et al. | 705/7.26 |
| 8,006,238 B2* | 8/2011 | Eichenberger et al. | 717/150 |
| 8,103,536 B2* | 1/2012 | Green et al. | 705/7.27 |
| 8,185,870 B2* | 5/2012 | Burdick et al. | 717/120 |
| 2004/0078105 A1* | 4/2004 | Moon et al. | 700/100 |
| 2004/0258061 A1 | 12/2004 | Sahni | |
| 2005/0171930 A1* | 8/2005 | Arning et al. | 707/2 |
| 2006/0074736 A1* | 4/2006 | Shukla et al. | 705/8 |
| 2006/0106585 A1* | 5/2006 | Brown et al. | 703/1 |
| 2006/0229924 A1* | 10/2006 | Aron et al. | 705/8 |
| 2009/0112779 A1 | 4/2009 | Wolf | |
| 2009/0158283 A1 | 6/2009 | Pinto | |
| 2009/0222827 A1 | 9/2009 | Pinto | |
| 2010/0199257 A1* | 8/2010 | Biggerstaff | 717/104 |

* cited by examiner

*Primary Examiner* — Meng An
*Assistant Examiner* — Abu Ghaffari
(74) *Attorney, Agent, or Firm* — Brian Haslam; Aaron Hoff; Micky Minhas (57) ABSTRACT

Partitioning continuation based runtime programs. Embodiments may include differentiating activities of a continuation based runtime program between public children activities and implementation children activities. The continuation based runtime program is partitioned into visibility spaces. The visibility spaces have boundaries based on implementation children activities. The continuation based runtime program is partially processes at a visibility space granularity.

19 Claims, 6 Drawing Sheets

Figure 4

METHOD AND SYSTEM FOR ITERATIVELY PARTITIONING AND VALIDATING PROGRAM TREES INTO ENVIRONMENTS AT VISIBILITY SPACE GRANULARITY

BACKGROUND

Background and Relevant Art

Computers and computing systems have affected nearly every aspect of modern living. Computers are generally involved in work, recreation, healthcare, transportation, entertainment, household management, etc.

A continuation based runtime executes activities. An activity represents a unit of executable code comprising of multiple pulses of work. Unlike conventional computer software programs that sequentially process data using a stack/heap, a continuation based program communicates by registering continuations and scheduling activities as future work to perform tasks. One of the ways an activity can execute multiple pulses of work is through the scheduling of child activities. This composition of activities enables custom control flows that can be implemented through the scheduling of child activities 0, 1 or n times as determined by the composite activity. An activity can also setup a resumable continuation in its execution that is resumed by a stimulus external to the runtime.

The runtime interprets this external stimulus as another pulse of work to be handled by the activity. Pulses of work are represented internally as continuations that the runtime invokes on activities (thus: continuation based runtime). Beyond this flexibility to create new control flows, and handle external resumptions, activities have the following characteristics: They have no process affinity—they can be paused and resumed in a different process. They have no thread affinity, different pulses of work can be run on different threads. They can be persisted and rehydrated Continuation based runtime programs are programs often described as a trees of recursively composable activities. It may be useful to partition trees into smaller sub-units.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments may include differentiating activities of a continuation based runtime between public children activities and implementation children activities. The continuation based runtime is partitioned into visibility spaces. The visibility spaces have boundaries based on implementation children activities. The continuation based runtime is partially processed at a visibility space granularity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Continuation based runtimes often describe programs as a tree of recursively composable activities. If the program tree can be partitioned into appropriate subsets it is possible to impose static data flow rules, understand environmental boundaries, implement performance optimizations, make guarantees about runtime object lifetimes, analyze subsets of the tree as though the whole tree had been processed, validate subsets of the tree, and uniquely identify members of the tree in a predictable and repeatable manner. Embodiments include functionality implementing mechanisms for partitioning a program tree into subsets with these qualities that are henceforth referred to as "visibility spaces."

Embodiments use a set of relationships between parent and child nodes in the program tree to determine whether the child belongs to the same visibility space as the parent or a new visibility space owned by the parent. Once a visibility space is completely defined it can be used to uniquely identify members, make decisions about symbol visibility with respect to the members, perform analysis of the validity of the program described by the subset in the visibility space, understand guarantees around runtime object lifetimes, and implement performance optimizations.

Embodiments may include functionality for partitioning a continuation based runtime program's activity tree into visibility spaces based on relationships between parent and child nodes in the tree. Those visibility spaces are then used to perform progressive processing of subsets of the tree. For example, progressive processing of subsets of the tree may be performed for preparing the tree for execution and/or validating the tree. Embodiments may include functionality whereby visibility spaces are used to uniquely identify each activity in the program. Embodiments may include functionality whereby visibility spaces are used to perform partial (and progressive) loading of "compiled" program information. Embodiments may include functionality whereby visibility spaces are used to define environmental boundaries and to enforce symbol resolution rules for data access in the program.

Some embodiments facilitate partitioning of a continuation based runtime program's activity tree into visibility spaces based on the differentiation between the consumer facing configurable surface area of an activity and the activity author's defined implementation. In particular, by differentiating between child activities of an activity that are public activities and child activities of an activity that are implementation activities, visibility space boundaries can be defined. As such, those visibility spaces can be used to differentiate between an activity's surface area and its implementation.

One mechanism for partitioning the tree into visibility spaces uses a defined set of rules based on the relationships between a parent and child node in the tree. Some relationships, such as a parent's relationship to an imported activity, mean that the imported activity is part of the same visibility space as the parent. Other relationships, such as a parent's relationship to an implementation variable's default expression activity, mean that the default expression activity is part of a new visibility space owned by the parent.

Figure 1A:
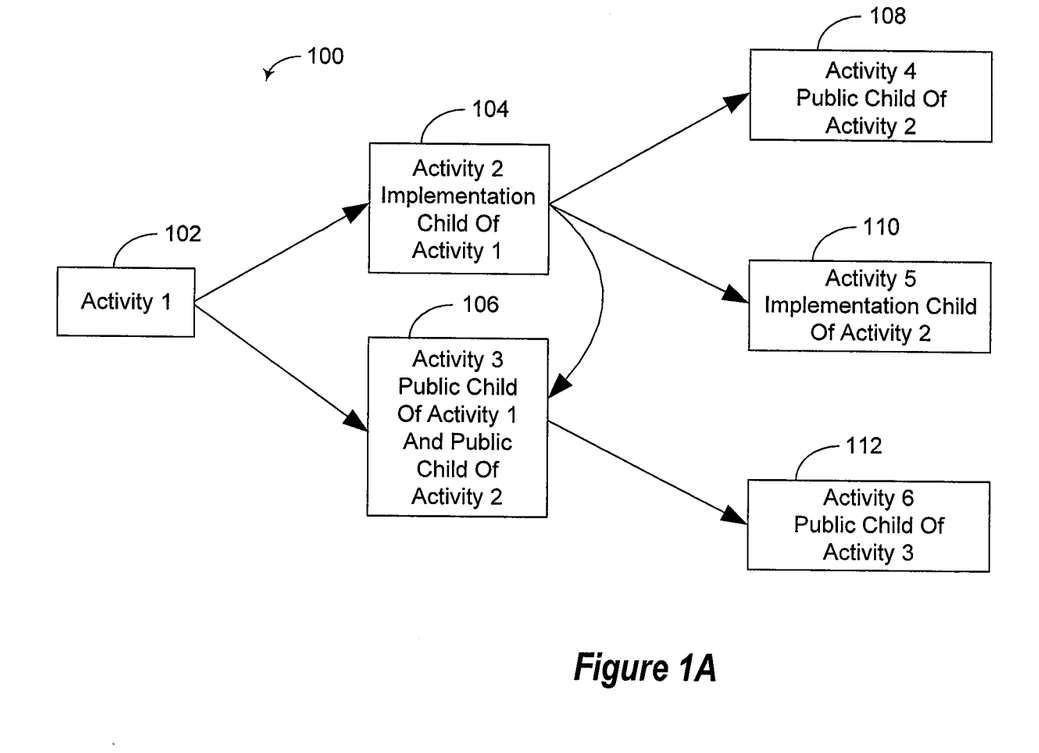
FIG. 1A illustrates a continuation based runtime graph.

Referring now to FIG. 1A, an example is illustrated. FIG. 1 illustrates a continuation based runtime graph 100 that includes six activities, 102, 104, 106, 108, 110, and 112. The six activities are arranged as follows: activity 102 is a root activity meaning that the activity has no parent activity and is the root of the graph 100. Activity 102 has two child activities, namely activity 104 and activity 106. Activity 104 is an implementation child of activity 102. Implementation children are activities which the activity author constructed or configured. Activity 106 is a public child of activity 102, and a public child of activity 104. Public children are activities which activity consumer configures. In particular, public children activities are activities that are intended to be provided by the consumer of the parent activities. Activity 108 is a public child of activity 104. Activity 110 is an implementation child of activity 104. Activity 112 is a public child of activity 106.

Visibility spaces, as noted previously, are partitioned based on activities being implementation children as opposed to public children. In particular, a process is begun at the root activity (e.g. activity 102) wherein the process identifies the tree of activities that includes the root activity and all public activities descendant from the root activity that have no intervening implementation activities between the root activity and the descendent activities. For example, FIG. 1B. illustrates a visibility space 114. The visibility space 114 includes the root activity 106 which is a public child of activity 102, and activity 112 which is a public child of activity 106. Note that activity 104 and any children of activity 104 are not included in the visibility space 114 because activity 104 is an implementation child of activity 102.

Figure 2:
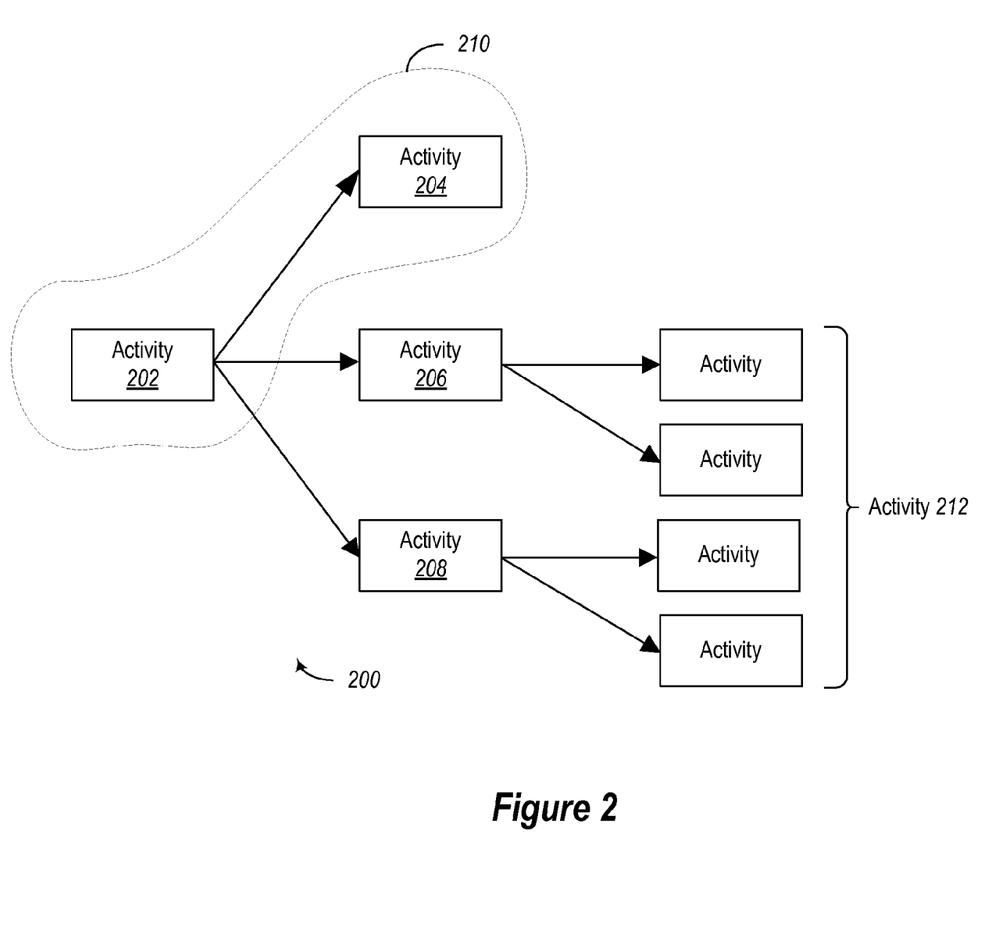
FIG. 2 illustrates a continuation based runtime graph with activities of equal hierarchical significance.

The process then selects from any remaining activities that are not already included in a visibility space the most hierarchically significant activity, and repeats the above steps as if the most hierarchically significant activity were a root activity. However, two significant points should be taken into account. First, there may exist a situation where remaining activities have equal hierarchical significance. For example, FIG. 2 illustrates the graph 200. The graph 200 includes a root activity 202. The graph further includes activities 204, 206, and 208. In this example, activity 204 is a public child of activity 202. Activity 206 and activity 208 are both implementation children of activity 202. Each of activities 206 and 208 are depicted with additional child activities as depicted by activities 112. When the process described above has been performed for the root activity 202, the visibility space if visibility space 210 will be created which includes the root activity 202 and activity 204. Activities 206 and 208 remain un-added to a visibility space, both of which have equal hierarchical significance. In this case, either activity 206 or 208 may be selected to be processed next without any significant negative consequences. Selection of which activity to process next may be performed randomly or pseudo randomly or in any appropriate fashion.

Figure 1B:
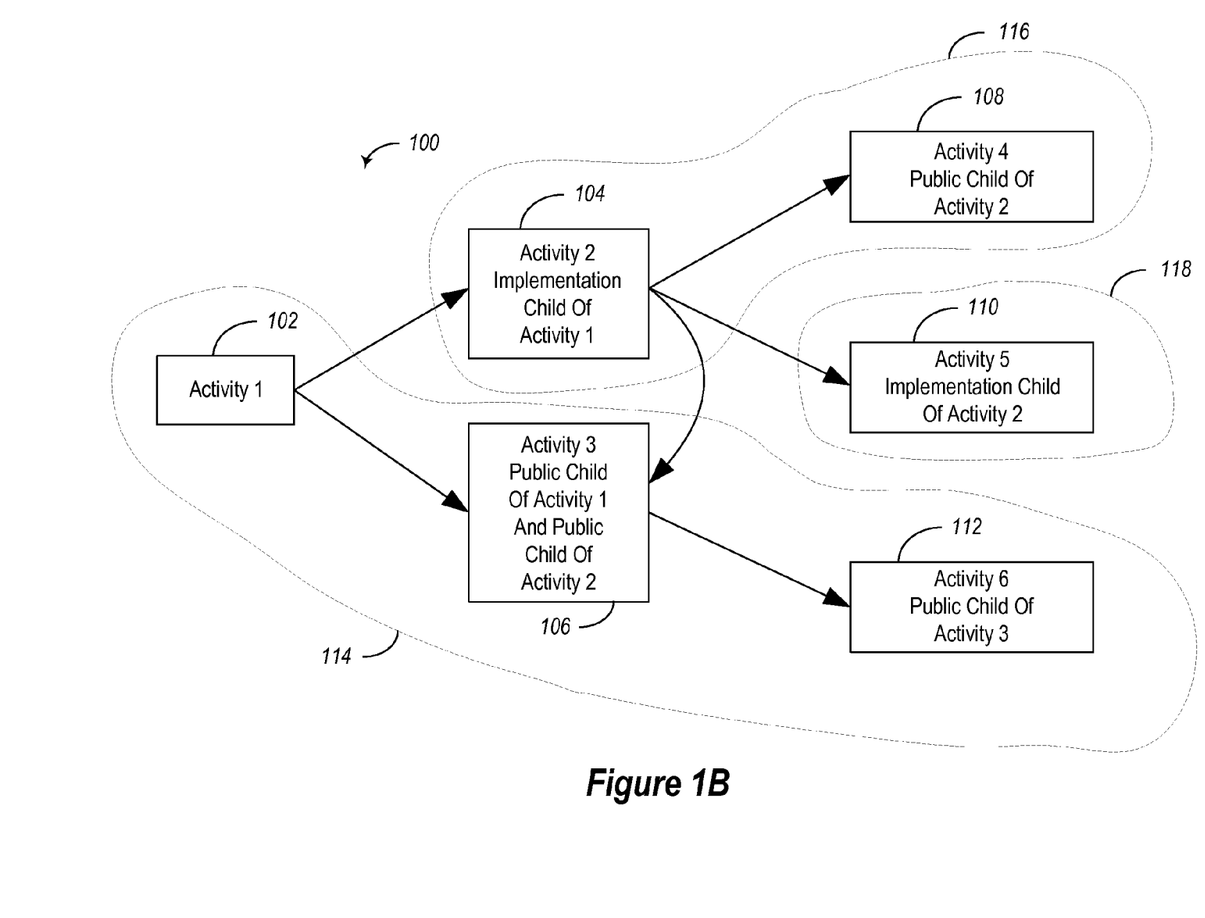
FIG. 1B illustrates partitioning of a continuation based runtime graph.

The second point of significance is that when processing remaining activities, any activity, irrespective of whether or not that activity is a public child of a remaining activity, which has already been included in another visibility space should not be included in other visibility spaces. In particular, in the present example, an activity should be included in only a single visibility space. An example is illustrated in FIG. 1B. In particular, as previously noted, activity 104 includes public children including activity 106 and activity 108. The visibility space 116 may be created which includes activity 104, and its public child activity 108. However, its public child activity 106 should not be included in the visibility space 116, because the child activity 106 has already been included as a public child of activity 102 in the visibility space 114.

FIG. 1B illustrates that the activity 110 remains un-added to a visibility space after partitioning other portions of the graph 100 into visibility spaces 114 and 116. Activity 110 cannot necessarily be processed by the methods described previously inasmuch as activity 110 does not have any child activities. Nonetheless, activity 110 can be partitioned into its own visibility space 118. In particular, when beginning the process described above, if a remaining activity does not include any children activities, then the remaining activity is partitioned into its own visibility space.

Figure 1C:
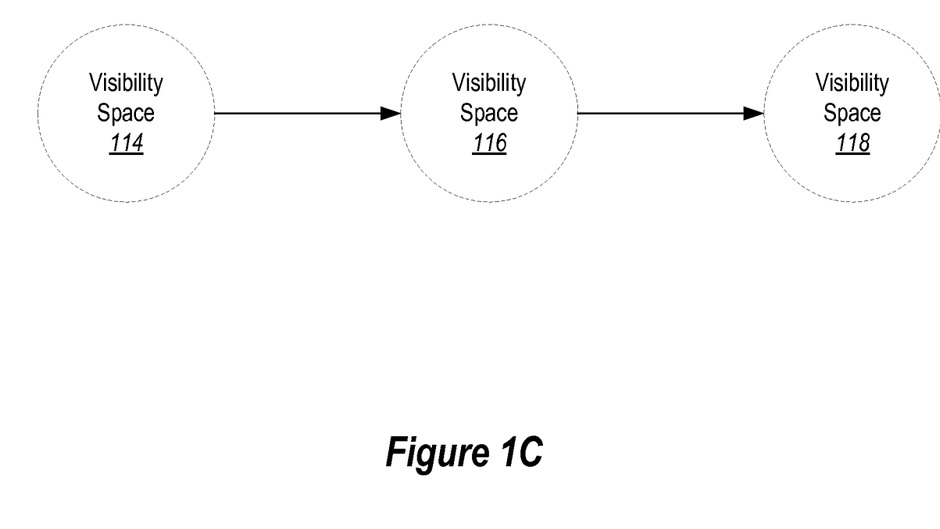
FIG. 1C illustrates familial relationships between visibility spaces.

Visibility spaces can also be related in a tree/graph. In particular, FIG. 1C illustrates an example whereby the visibility space 114 is the parent of visibility space 116 which is the parent of visibility space 118. Information may be maintained defining this graphical relationship. In some embodiments, information may be maintained which defines a lineage of a visibility space to an activity in a parent visibility space. For example, information may be maintained which identifies the visibility space 114 as the parent of visibility space 116 along with information that identifies activity 102 (as illustrated in FIG. 1B) as the parent of the visibility space 116. Similarly, visibility space 118 may have information associated with it that identifies visibility space 116 as the parent of visibility space 118 along with information that identifies the activity 104 as the parent of the visibility space 118.

In this way embodiments are able to process the entire tree and place a given node either into the "current" visibility space or a newly created child visibility space. Additionally, the child visibility space maintains data regarding how it is connected to the previous visibility space. As such, the end result is a tree of visibility spaces where each visibility space contains some non-overlapping subset of the workflow program tree. Note that embodiments may be implemented where the subsets in a visibility space are not necessarily parts of trees themselves because they often contain multiple root nodes. As an example, if an activity has two implementation children then both, in some embodiments, may be placed in the same visibility space even though, from the point of view of the subset of activities contained in the visibility space, there is no tree relationship between the two implementation children.

It should be noted that a different set of relationships and rules regarding those relationships could be used to partition the tree. The end result could potentially provide different benefits such as the ability to predict the ambient environment in which the activities will execute at runtime or the ability to make some predictions about execution ordering.

Once the tree is partitioned into visibility spaces, various problems can be solved using the visibility spaces.

In particular, visibility spaces may be used to perform partial tree/graph processing at a visibility space granularity. If it is assumed that all child visibility spaces are valid then it is possible to validate the parent visibility space without consideration for the children. The same applies to dynamic update. If it is assumed that all child visibility spaces are fixed then it is possible to perform dynamic update operations to a single visibility space without concern for any others. In both cases, this greatly reduces and simplifies the processing necessary.

Visibility spaces can be used to uniquely identify activities. Embodiments may be implemented where a given program tree will always produce the same set of visibility spaces with the same relationships between them. This means that an activity can be uniquely identified by tracing it back to the root visibility space. For example, for a given tree, the 4th activity in the visibility space parented by the 2nd activity in the visibility space parented by the 5th activity in the root visibility space could be uniquely identified as 5.2.4 because this is the path from the root to the target activity. This unique identification scheme may have a number of benefits. First, because visibility spaces are unrelated it is possible to only create and process the visibility spaces referenced in the name to process the target activity. Using the example above, one would have to process the root visibility space, the visibility space owned by the 5th activity in the root, and the visibility space owned by the 2nd activity in the latter visibility space. Second, because these dotted names are reliably recreateable given the same program tree, it is possible to use these names in the persisted state without having to persist, more information regarding the program tree nor process the entire program tree at once in order to find the activity related to a given name.

Visibility spaces can be used to accomplish partial loading of continuation based runtimes into memory. As noted above, processing an activity only requires that all visibility spaces between the one it belongs to and the root have been processed. All other visibility spaces can be ignored. This means that program information can be partially loaded into memory to coincide only with the currently active portion of the program.

Visibility spaces can be used to perform environment determination. Some embodiments create visibility spaces in such a way to draw the boundaries of environments. Specifically, embodiments may only allow an activity to access symbols that are part of the same visibility space (per the parent/child relationship rules) as well as the arguments to the owner of the current activity's visibility space. In this way embodiments are able to make guarantees about the maximal lifetime of a symbol's value at runtime as well as enforce data flow rules which promote the ability to perform static data flow analysis.

Visibility spaces can be used to accomplish public surface and private implementation differentiation. As noted, by using partitioning procedure above, whereby differentiating between public and implementation activities, the visibility spaces are so constructed such that differentiating between the public surface area (what the activity consumer configures) and the private implementation (what the activity author constructed or configured) can be accomplished. Combined with information about the current user's desired "view" of the workflow program this information can be used to show only the aspects that the user cares about. For example, if a user is the author of the workflow as well as activities Foo and Bar then the user can be provided a view of the workflow's activities as well as Foo's implementation and Bar's implementation. If Foo, however, is constructed from some activity Foobar then the user would not see the implementation of Foobar.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 3:
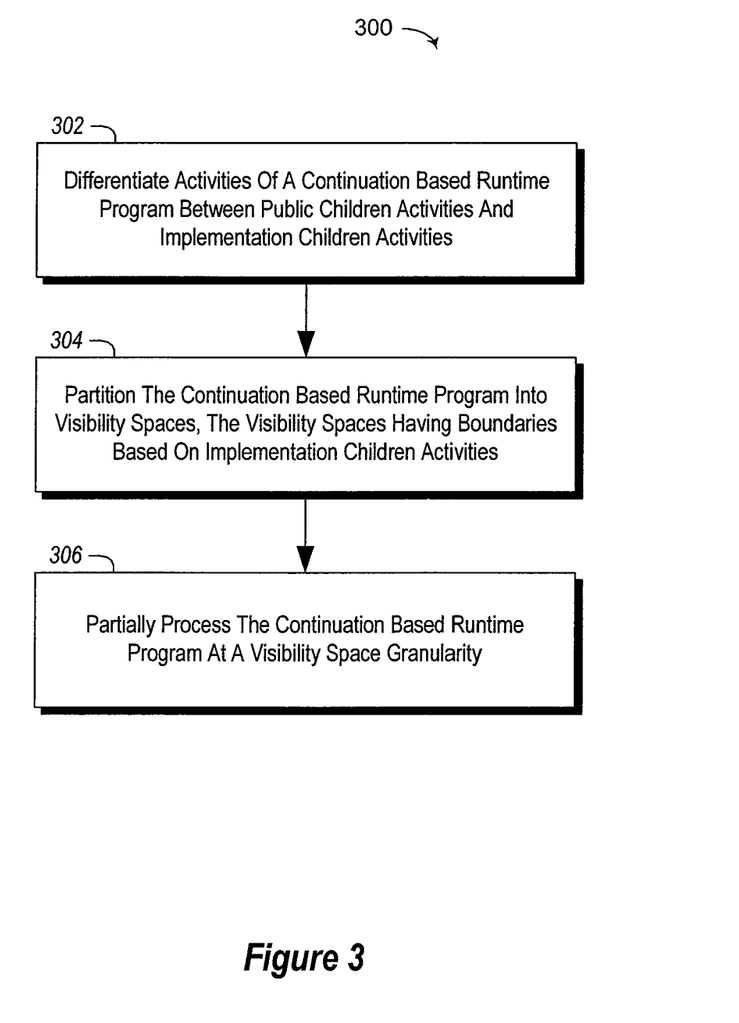
FIG. 3 illustrates a method of partitioning a continuation based runtime graph and processing at visibility space granularity.

Referring now to FIG. 3, a method 300 is illustrated. The method 300 may be practiced in a computing environment including continuation based runtimes. The method 300 includes an act of differentiating activities of a continuation based runtime between public children activities and implementation children activities (act 302). For example, as illustrated in FIG. 1A, some child activities are public children of their parent activities, such as activities 106, 108 and 112. Some child activities are implementation children of their parent activities, such as activities 104 and 110.

The method 300 further includes partitioning the continuation based runtime into visibility spaces, the visibility spaces having boundaries based on implementation children activities (act 304). In particular, partitioning is performed such that within a given visibility space all activities in a given visibility space are at least one of a root activity, an implementation child activity, or descendents of either the root activity or an implementation child activity included in the given visibility space. Additionally, any intervening activity between the root activity or implementation child activity and any descendent of either the root activity or an implementation child activity included in the given visibility space, as well as any descendent of either the root activity or an implementation child activity included in the given visibility space, is a public child of its parent. Any given activity is included in only a single visibility space.

Partitioning the continuation based runtime into visibility spaces may be performed iteratively beginning at a root activity. The root activity is the most hierarchically significant activity. Processing proceeds iteratively, partitioning visibility spaces from most hierarchically significant activities to least hierarchically significant activities of the continuation based runtime program. The least hierarchically significant activities are leaf activities having no children.

The method 300 further includes partially processing the continuation based runtime program at a visibility space granularity (act 306). For example, in one embodiment, partially processing the continuation based runtime program at a visibility space granularity may include partially validating the continuation based runtime program by validating at a visibility space granularity. Alternatively or additionally, partially processing the continuation based runtime program at a visibility space granularity may include partially updating the continuation based runtime program by updating at a visibility space granularity. Alternatively or additionally, partially processing the continuation based runtime program at a visibility space granularity may include partially loading the continuation based runtime program by loading at a visibility space granularity. Alternatively or additionally, partially processing the continuation based runtime program at a visibility space granularity may include using the visibility spaces to uniquely identify an activity by numerically identifying an activity in a given visibility space from the perspective of the given visibility space, identifying a parent activity for the given visibility space, and iteratively identifying parents for activity trees until the root activity is reached.

Figure 4:
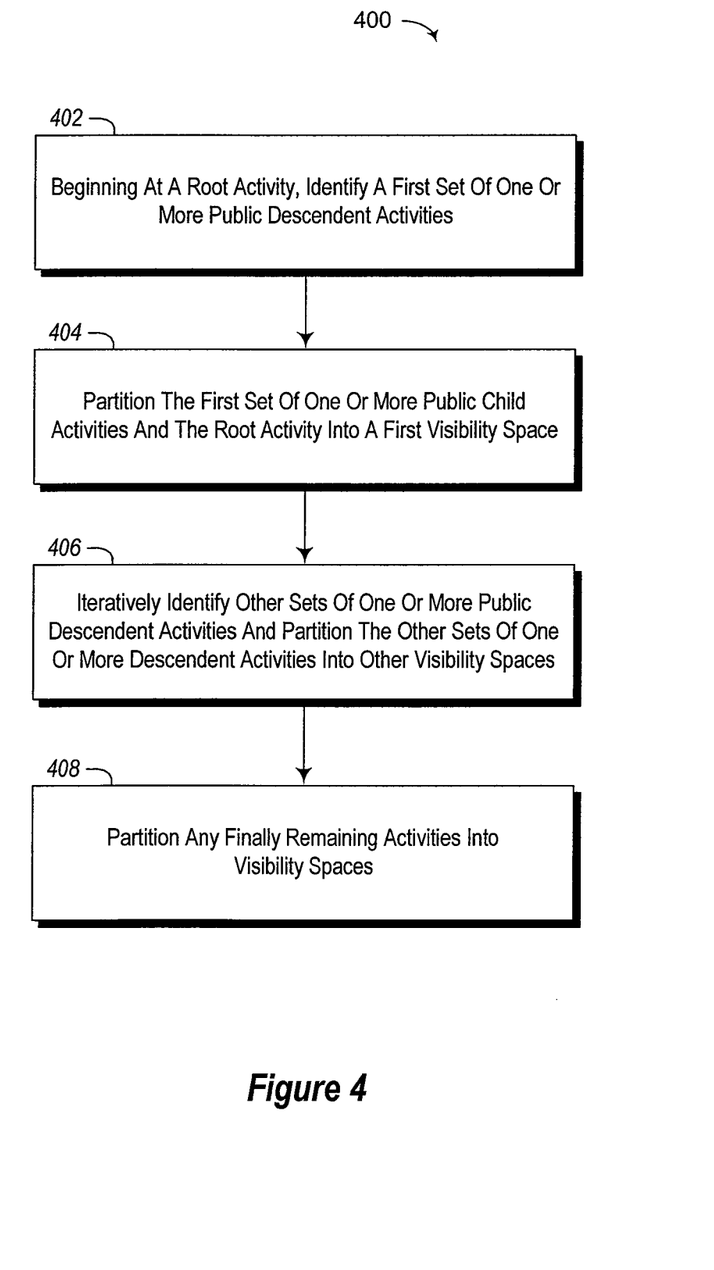
FIG. 4 illustrates a method of partitioning a continuation based runtime graph using child and dependent activities.

Referring now to FIG. 4, another method 400 is illustrated. The method may be practiced in a computing environment including continuation based runtimes. The method includes beginning at a root activity, identifying a first set of one or more public descendent activities (act 402). This is performed by identifying a first set of one or more public child activities, and for each child activity in the first set identifying a set of public child activities, and combining these sets to form single resultant set such that all members of the set are descendents of the root activity and each intervening activity between the root activity and each descendent, including each descendent, is a public child of its parent. A public child of a parent includes an activity that is intended to be provided by the consumer of the parent.

The method 400 further includes partitioning the first set of one or more public child activities and the root activity into a first visibility space (act 404).

The method 400 further includes iteratively identifying other sets of one or more public descendent activities and partitioning the other sets into other visibility spaces (act 406). In particular, embodiments may be practiced where for a remaining activity not already included in a visibility space, acts for identifying another set of one or more public child activities are performed, and for each child activity in the other set acts for identifying a set of public child activities are performed. These sets are combined to form single resultant set such that all members of the set are descendents of the remaining activity and each intervening activity between the remaining activity and each descendent, including each descendent, is a public child of its parent. The resultant set does not include, but rather specifically excludes, any activities that have already been included in another visibility space. The resultant set of one or more descendent activities is partitioned into another visibility space.

For any remaining activities in the continuation based program that have not yet been partitioned into a visibility space the method 400 includes an act for partitioning each of the remaining activities into their own visibility space (act 408). A remaining activity is not a public child of its parent activity, but rather is an implementation child activity of its parent activity. A remaining activity has no children activities.

The method 400 may be performed where the act of, for a remaining activity not already included in a visibility space, identifying another set of one or more public descendent activities of the remaining activity, includes performing the act for a most hierarchically significant remaining activity.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including continuation based runtime programs, wherein a continuation based runtime executes activities, where an activity represents a unit of executable code including a plurality of discrete elements of work, and wherein composition of the activities enables custom control flows that can be implemented through the scheduling of child activities 0, 1 or n times, a method of partitioning the activities of a given continuation based runtime program into a plurality of distinct visibility spaces based on a differentiation between public and implementation activities, the method comprising:

identifying each of a plurality of activities of a continuation based runtime program as one of a public child activity and an implementation child activity, a public child being an activity intended to be provided by a consumer of a parent activity and an implementation child activity being an activity an author constructed or configured;

partitioning the continuation based runtime into visibility spaces based on the identified public child and implementation child activities, the visibility spaces having boundaries based on the identified implementation children activities of the plurality of activities, such that within a given visibility space all activities in the given visibility space are at least one of a root activity, an implementation child activity, or descendants of either the root activity or an implementation child activity included in the given visibility space, and wherein any intervening activity between the root activity or implementation child activity and any descendent of either the root activity or an implementation child activity included in the given visibility space, as well as any descendent of either the root activity or an implementation child activity included in the given visibility space, is a public child of its parent, and wherein any given activity is included in only a single visibility space; and partially processing the continuation based runtime at a visibility space granularity using the visibility spaces to uniquely identify the activity by numerically identifying the activity in the given visibility space from a perspective of the given visibility space, identifying a parent activity for the given visibility space, and iteratively identifying parents for activity trees until the root activity is reached.

2. The method of claim 1, wherein partitioning the continuation based runtime program into the visibility spaces is performed iteratively beginning at a base root activity, the base root activity being a most hierarchically significant activity, and proceeds iteratively partitioning visibility spaces from the most hierarchically significant activity to least hierarchically significant activities, the least hierarchically significant activities being leaf activities having no children, of the continuation based runtime.

3. The method of claim 1, wherein partially processing the continuation based runtime program at the visibility space granularity comprises partially validating the continuation based runtime program by validating at the visibility space granularity.

4. The method of claim 1, wherein partially processing the continuation based runtime at a visibility space granularity comprises partially updating the continuation based runtime program by updating at the visibility space granularity.

5. The method of claim 1, wherein partially processing the continuation based runtime at the visibility space granularity comprises partially loading the continuation based runtime program by loading at the visibility space granularity.

6. In a computing environment including continuation based runtimes, wherein a continuation based runtime executes activities, where an activity represents a unit of executable code including a plurality of discrete elements of work, and wherein composition of activities enables custom control flows that can be implemented through the scheduling of child activities 0, 1 or n times, a method of partitioning the activities of a given continuation based runtime into a plurality of distinct visibility spaces based on a differentiation between public and implementation activities, the method comprising:

beginning at a root activity, identifying a first set of one or more public child activities, and for each child activity in the first set identifying a further set of public child activities, and combining these sets to form a single resultant set such that all members of the single resultant set are descendants of the root activity and each intervening activity between the root activity and each descendent, including each descendent, is a public child of its parent, such that there are no intervening implementation activities between the root activity and the public child activities, wherein a public child of a parent comprises an activity that is intended to be provided by a consumer of the parent;

partitioning the activities of continuation based runtime into distinct visibility spaces based on a differentiation between public and implementation activities by:

partitioning the first set of one or more public child activities and the root activity into a first visibility space;

iteratively performing the following until all activities in the continuation based runtime program with children are partitioned into visibility spaces:

for a remaining activity not already included in the visibility space and having at least one public child activity, identifying another set of one or more public child activities, and for each child activity in the another set identifying a set of public child activities, and combining these sets to form single resultant set such that all members of the set are descendents of the remaining activity and each intervening activity between the remaining activity and each descendent, including each descendent, is a public child of its parent, and the another set specifically excluding any activities that have already been included in another visibility space;

partitioning the another set of one or more descendent activities into a further another visibility space; and for any finally remaining activities in the continuation based runtime that have not yet been partitioned into a visibility space, because the remaining activity is not a public child of its parent activity, but rather is an implementation child activity of its parent activity, but whose parent activity has been partitioned into a visibility space, and which finally remaining activities have no children activities, partitioning each of the any finally remaining activities into each their own visibility space; and partially processing the continuation based runtime program by processing one or more visibility spaces without processing one or more other visibility spaces for the continuation based runtime program using the visibility spaces to uniquely identify the activity by numerically identifying the activity in the given visibility space from the perspective of the given visibility space, identifying a parent activity for the given visibility space, and iteratively identifying parents for activity trees until the root activity is reached.

7. The method of claim 6, wherein for the remaining activity not already included in the visibility space and having at least one public child activity, identifying another set of one or more public child activities comprises identifying another set of one or more public child activities for a most hierarchically significant remaining activity.

8. The method of claim 6, wherein processing comprises partially validating the continuation based runtime program by validating at the visibility space granularity.

9. The method of claim 6, wherein processing comprises partially updating the continuation based runtime program by updating at the visibility space granularity.

10. The method of claim 6, further comprising partially loading the continuation based runtime program by loading at the visibility space granularity.

11. In a computing environment including continuation based runtimes, wherein a continuation based runtime executes activities, where an activity represents a unit of executable code including a plurality of discrete elements of work, and wherein composition of activities enables custom control flows that can be implemented through the scheduling of child activities 0, 1 or n times, a method of partitioning the activities of a given continuation based runtime program into a plurality of distinct visibility spaces based on a differentiation between public and implementation activities, the method comprising:

beginning at a root activity, identifying a first set of one or more public child activities, and for each child activity in the first set identifying a further set of public child activities, and combining these sets to form a single resultant set such that all members of the single resultant set are descendants of the root activity and each intervening activity between the root activity and each descendent, including each descendent, is a public child of its parent, such that there are no intervening implementation activities between the root activity and the public child activities, wherein a public child of a parent comprises an activity that is intended to be provided by a consumer of the parent;

partitioning the activities of continuation based runtime into distinct visibility spaces based on a differentiation between public and implementation activities by:

partitioning the first set of one or more public child activities and the root activity into a first visibility space;

iteratively performing the following until all activities in the continuation based runtime with children are partitioned into visibility spaces:

for one or more remaining activities that are hierarchically at the same level and have at least one public child activity, but that are not already included in a visibility space, identifying another set of one or more public child activities of the one or more remaining activities that are hierarchically at the same level, and for each child activity in the another set identifying a set of public child activities, and combining these sets to form single resultant set such that all members of the set are descendants of the one or more remaining activities hierarchically at the same level and each intervening activity between the one or more remaining activities hierarchically at the same level and each descendent, including each descendent, is a public child of its parent, and the another set specifically excluding any activities that have already been included in another visibility space;

partitioning the another set of one or more descendent activities into a further another visibility space; and for any finally remaining activities in the continuation based runtime that have not yet been partitioned into a visibility space, because the remaining activity is not a public child of its parent activity, but rather is an implementation child activity of its parent activity, but whose parent activity has been partitioned into a visibility space, and which finally remaining activities have no children activities, partitioning each of the any finally remaining activities into visibility spaces based on their hierarchical significance; and partially processing the continuation based runtime by processing at least one visibility space without processing at least one other visibility space for the continuation based runtime program using the visibility spaces to uniquely identify the activity by numerically identifying the activity in the given visibility space from the perspective of the given visibility space, identifying a parent activity for the given visibility space, and iteratively identifying parents for activity trees until the root activity is reached.

12. The method of claim 11, wherein for one or more remaining activities that are hierarchically at the same level, but that are not already included in the visibility space, identifying another set of one or more public child activities of the one or more remaining activities that are hierarchically at the same level, and partitioning the activities of the continuation based runtime into distinct visibility spaces based on a differentiation between public and implementation activities for a set of most hierarchically significant remaining activities.

13. The method of claim 11, wherein partially processing the continuation based runtime comprises partially validating the continuation based runtime program by validating at the visibility space granularity.

14. The method of claim 11, wherein partially processing the continuation based runtime comprises partially updating the continuation based runtime program by updating at the visibility space granularity.

15. A system comprising one or more computer processors, system memory, and computer-executable instructions executable upon the one or more computer processors, the system enabling a computing environment including continuation based runtime programs, wherein a continuation based runtime executes activities, where an activity represents a unit of executable code including a plurality of discrete elements of work, and wherein composition of the activities enables custom control flows that can be implemented through the scheduling of child activities 0, 1 or n times, the system, upon executing the computer-executable instructions upon the one or more processors, further enabling performance of a method of partitioning the activities of a given continuation based runtime program into a plurality of distinct visibility spaces based on a differentiation between public and implementation activities, the method comprising:

identifying each of a plurality of activities of a continuation based runtime program as one of a public child activity and an implementation child activity, a public child being an activity intended to be provided by a consumer of a parent activity and an implementation child activity being an activity an author constructed or configured;

partitioning the continuation based runtime into visibility spaces based on the identified public child and implementation child activities, the visibility spaces having boundaries based on the identified implementation children activities of the plurality of activities, such that within a given visibility space all activities in the given visibility space are at least one of a root activity, an implementation child activity, or descendants of either the root activity or an implementation child activity included in the given visibility space, and wherein any intervening activity between the root activity or implementation child activity and any descendent of either the root activity or an implementation child activity included in the given visibility space, as well as any descendent of either the root activity or an implementation child activity included in the given visibility space, is a public child of its parent, and wherein any given activity is included in only a single visibility space; and partially processing the continuation based runtime at a visibility space granularity using the visibility spaces to uniquely identify the activity by numerically identifying the activity in the given visibility space from a perspective of the given visibility space, identifying a parent activity for the given visibility space, and iteratively identifying parents for activity trees until the root activity is reached.

16. The system of claim 15, wherein partitioning the continuation based runtime program into the visibility spaces is performed iteratively beginning at a base root activity, the base root activity being a most hierarchically significant activity, and proceeds iteratively partitioning visibility spaces from the most hierarchically significant activity to least hierarchically significant activities, the least hierarchically significant activities being leaf activities having no children, of the continuation based runtime.

17. The system of claim 15, wherein partially processing the continuation based runtime program at the visibility space granularity comprises partially validating the continuation based runtime program by validating at the visibility space granularity.

18. The system of claim 15, wherein partially processing the continuation based runtime at a visibility space granularity comprises partially updating the continuation based runtime program by updating at the visibility space granularity.

19. The system of claim 15, wherein partially processing the continuation based runtime at the visibility space granularity comprises partially loading the continuation based runtime program by loading at the visibility space granularity.

* * * * *